United States Patent [19]

Jarschel

[11] 4,366,707
[45] Jan. 4, 1983

[54] APPARATUS FOR OPTIMIZING TIRE OR WHEEL CHARACTERISTICS

[75] Inventor: Rainer Jarschel, Egelsbach, Fed. Rep. of Germany

[73] Assignee: Firma Carl Schenck AG, Darmstadt, Fed. Rep. of Germany

[21] Appl. No.: 239,419

[22] Filed: Mar. 2, 1981

[30] Foreign Application Priority Data

Mar. 18, 1980 [DE] Fed. Rep. of Germany ....... 3010315

[51] Int. Cl.³ .......................................... G01M 17/02
[52] U.S. Cl. .......................................... 73/146; 73/462
[58] Field of Search .................................. 73/146, 462

[56] References Cited

U.S. PATENT DOCUMENTS

| | | | |
|---|---|---|---|
| 3,091,125 | 5/1963 | Budnick et al. | 73/462 |
| 3,151,485 | 10/1964 | Federn et al. | 73/462 |
| 3,412,615 | 11/1968 | Nedley | 73/146 X |
| 4,171,641 | 10/1979 | Landsness | 73/146 |

Primary Examiner—James J. Gill
Attorney, Agent, or Firm—W. G. Fasse; D. F. Gould

[57] ABSTRACT

The operating or running characteristics of a vehicle tire or rim with a tire secured thereto are optimized on one and the same machine. For this purpose the tire or wheel is supported on a subcritically tuned support bridge structure and driven by a spindle with an adjustable r.p.m. The vibrations of the support bridge structure are measured and converted into respective electrical signals representing a wheel unbalance and/or tire non-uniformities while a drum is pressed with a predetermined force against the tire or vice versa. This force is also measured as an electrical signal. An angular position sensor is operatively connected to the tire or spindle and provides an electrical signal representing the instantaneous tire or wheel position relative to a polar coordinate system.

14 Claims, 3 Drawing Figures

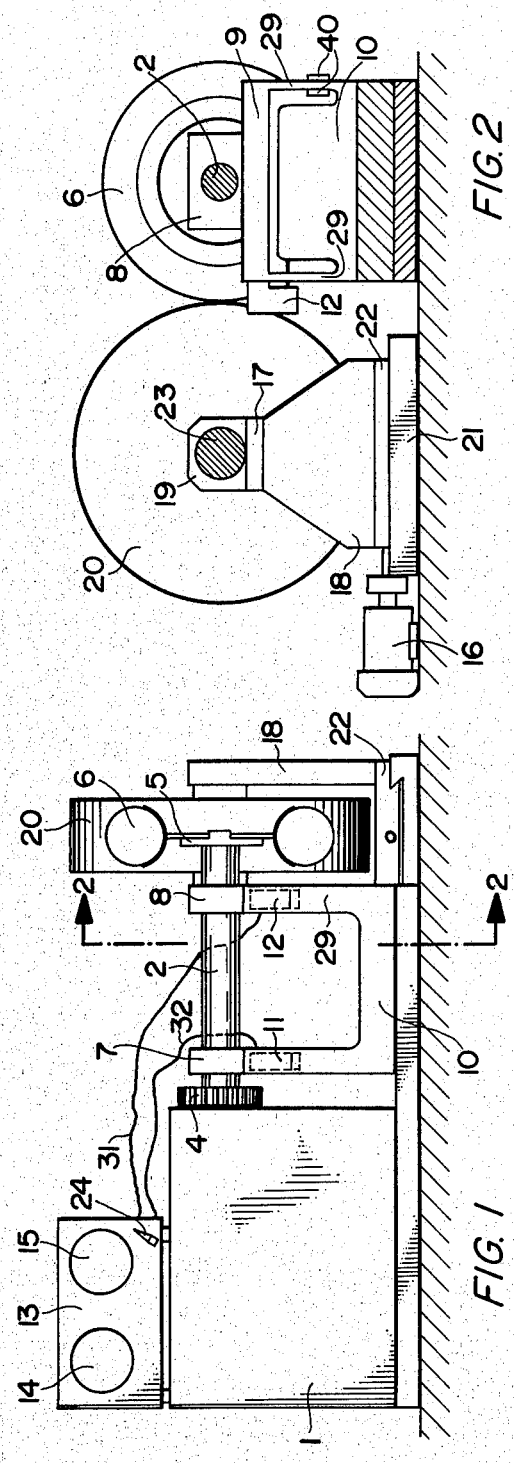

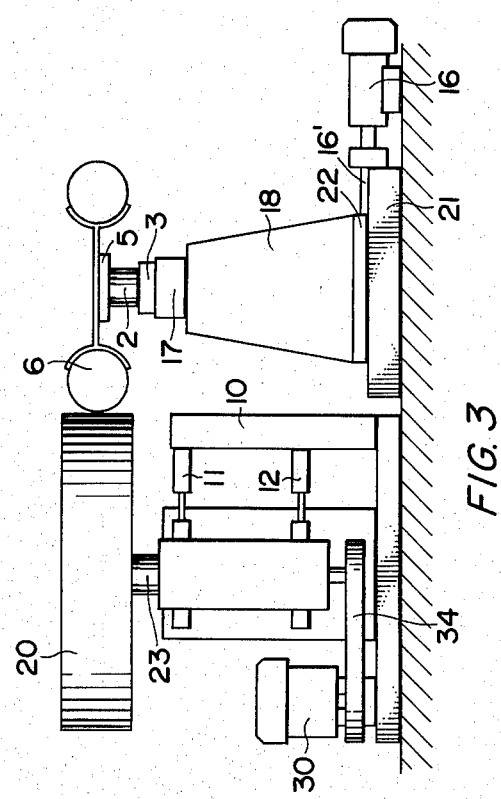

APPARATUS FOR OPTIMIZING TIRE OR WHEEL CHARACTERISTICS

BACKGROUND OF THE INVENTION

The invention relates to an apparatus for optimizing the running or operating characteristics of tires or wheels comprising rims with tires secured thereto.

Such machines are well known in the art as so-called force measuring balancing machines. In such machines the output signals of vibration sensors and the output signals of angular position pick-ups are multiplied, for example, in a known manner by means of a watt meter or the like. However, it is also possible to perform the multiplication by means of an electronic multiplier. Force measuring balancing machines determine the unbalance or imbalance of a tire at a given mean speed in the order of about 50 kilometers per hour. By multiplying the output signals of the vibration sensors and of the angular position pick-up, it is possible to eliminate disturbances, that is, forces which do not have the frequency corresponding to the r.p.m. or rotational frequency.

U.S. Pat. No. 3,527,103 discloses a machine for measuring the tire uniformity. In this apparatus force vibrations are measured at a constant r.p.m. or speed and the respective Fourier coefficients are determined for the desired harmonic, whereby it is possible to determine the size and phase position of any deviation. Based on these results the tire may be corrected by applying or removing rubber to or from the tire. The structure of the apparatus according to U.S. Pat. No. 3,527,103 requires operation at a constant measuring speed. Such measuring speed must be relatively low in order to provide an indication, especially of the phase angle which is at least somewhat accurate.

An article entitled "Uniformity Testing of Tires" which appeared in "Automobiltechnische Zeitschrift 77" (1975) Number 2, pages 46 to 49 describes an apparatus for determining the tire uniformity in which the force variations related to selectable rotational angles of the tire are measured or determined and stored in a computer. The stored values are then digitized and used for calculating the Fourier coefficients of the first or higher harmonic of the force variations. This machine for the uniformity control of a tire production is highly precise. However, this known apparatus can be manufactured in a economic way only if again relatively low measuring speeds are satisfactory.

It has been found that low measuring speeds or rather low circumferential speeds necessary for such low measuring speeds are disadvantageous because the tire non-uniformity and unbalance may change at higher tire rotational speeds due to inhomogenities of the tire rubber. Thus, it is desirable to perform the testing at speeds which simulate the actual rotational speeds when a tire is used on a vehicle travelling on a road.

OBJECTS OF THE INVENTION

In view of the above it is the aim of the invention to achieve the following objects singly or in combination:

to ascertain or measure the values which determine the running characteristics of a tire in an economical and technically simple manner even at higher rotational tire speeds;

to determine the tire non-uniformity in a technical and economically simple manner at higher rotational tire speed;

to ascertain all required data for determining the tire non-uniformity while the tire is held in the same tire or wheel mounting apparatus during the entire testing operation so that tolerances or errors resulting from moving the tire from one machine to the other, for example, from an imbalance testing machine to a non-uniformity testing machine are avoided;

to optimize the running characteristics of tires or wheel mounted tires even at high, realistic operational speeds; and to compensate all types of deviations from an ideal tire at a given operational speed by means of balancing weights, thereby avoiding removing tire material as was practiced heretofore.

SUMMARY OF THE INVENTION

According to the invention there is provided a rotatable drum and a wheel or tire mounting spindle mounted for relative movement between a tire and the drum on a machine or base. Either the rotatable drum or the wheel mount is supported on a carriage with drive means for contacting or engaging the rotating drum with a mounted tire. The rotating spindle for either the rotatable drum assembly or the spindle for the wheel and tire mounting is coupled to an oscillating bridge resiliently mounted to the machine bed. Transducers in the resilient coupling generate first signals corresponding to the vibratory motion of the bridge in response to unbalances or non-uniformities of a mounted tire rotating at a desired speed. An angular position detector coupled to the wheel or tire mounting spindle provides second signals indicative of the angular position of the tire relative to an angular zero position. Multiplication of the first signals with the second signals provides information necessary for defining the location of non-uniformities on or in the mounted tire or wheel. Further time integration of the multiplied signals provides information of wheel unbalances independent of the rotational speed of a wheel.

According to the preferred embodiment of the invention, the apparatus for optimizing road characteristics of tires and wheels can assume various configurations. For example, the rotating drum and the mounted wheel or tire frictionally driven by the drum, can be mounted for rotation in a common vertical plane on horizontal spindles, or mounted for rotation in a common horizontal plane on vertical spindles. Relative motion between the drum assembly and the wheel or tire mount for engaging and disengaging the drum and tire may be accomplished by translation or displacement on the machine base of either the drum assembly or the wheel mount. Furthermore, any vibratory response to the wheel unbalance or non-uniformity can be measured at either the drum assembly or at the wheel mount. This is accomplished by coupling and mounting either the drum assembly or the wheel mount to an oscillation bridge which is resiliently supported on the machine base. Signals corresponding to lateral vibrations and to the angular spindle position are processed according to whether a uniformity or an unbalance information is desired.

The invention also contemplates a support bridge or oscillating bridge which is subcritically tuned. The bridge includes two pedestal bearings upon which the horizontal wheel mounting spindle rests in one embodiment. In another embodiment the support bridge pedestals form arm bearings one above the other supporting the drum mounting spindle in a horizontal axis position. In both embodiments, the support bridge or oscillating bridge is resiliently mounted to the base for reflecting vibrations caused by wheel or tire unbalances.

It is an important advantage of the invention according to claim 1 that the values which characterize the tire performance and which must be ascertained, can be ascertained while the tire or wheel remains in one and the same machine on the same tire mounting means. Thus, any errors which may be caused by the unavoidable tolerances when changing the machine or the tire mounting means are eliminated. This error elimination is very important because such errors used to result in difficulties, especially at higher circumferential speeds of the tire.

Ascertaining the tire non-uniformity even at higher circumferential tire speeds in accordance with the characterizing clause of claim 2, has the advantage that the running characteristics of the tires or wheels may be optimized at such higher speeds. As a result, substantial improvements may be made in the running characteristics of the tires particularly for the speed range which is of practical interest to the tire user.

The predetermined or predeterminable force by means of which the tire is pressed against the drum is measured in a practical way by means of a force transducer. If it is intended or required to measure higher harmonics than the first harmonic, the frequency of the output signal of the angular position pick-up may be multiplied.

Heretofore it was customary first to perform the balancing operation by applying balancing weights and then to remove radial and/or lateral force variations by grinding off rubber at the tire shoulders. The invention avoids this double operation on separate machines by compensating for all deviations from the ideal tire which are measured at one speed, solely by the application of a balancing weight.

BRIEF FIGURE DESCRIPTION

In order that the invention may be clearly understood, it will now be described, by way of example, with reference to the accompanying drawings, wherein:

FIG. 1 is a schematic side view of an apparatus according to the invention in which the tire to be tested is held in a vertical plane on a drive shaft which is horizontally supported by means of an oscillating bridge;

FIG. 2 is a sectional view along section line 2—2 in FIG. 1; and

FIG. 3 is a modified embodiment in which the tire rotates in a horizontal plane supported by a vertical shaft, whereby the tire driving drum is connectable to a vibrating or oscillating supporting bridge.

DETAILED DESCRIPTION OF PREFERRED EXAMPLE EMBODIMENTS AND OF THE BEST MODE OF THE INVENTION

In FIG. 1 the horizontally supported spindle 2 is driven by a d.c. motor housed in the housing 1. Generally, the d.c. motor will drive the spindle through gear drive means also housed in the housing 1. Between the spindle and its drive means there is arranged an angle detector or pick-up means of conventional construction which connects the drive means in a form-locking or force transmitting manner to the spindle 2. The angular pick-up is arranged in the housing 1 and therefore not shown in FIG. 1. Such angular position detector or pick-up may comprise a mechanical coupling with the drive shaft or spindle 2 and an appropriate transducer for ascertaining the angular position or phase of the shaft and therefore also of the tire or wheel. In addition to electro-mechanical and magnetic angular position detectors a suitable optical detector or other transducer may be used as an alternate angular position detecting means.

With the aid of the angle disk 4 the operator is enabled to transfer the angular location indicated by the measuring instrument onto the spindle 2 or onto the tire, that is, he may, for example, mark on the tire the "hard" or "soft" spot. Angular position signals provided by the disk 4 may also be picked up by a phase pick-up 3 shown in FIG. 3, relative to the rotation of the spindle 2 or rather of the tire 6 which is operatively secured to the free end of the spindle 2 by means of a mounting flange 5. The spindle 2 is horizontally supported on pedestal bearings 7 and 8 which form a vibrating or oscillating bridge 9. The bridge 9 in turn is secured to the machine bed 10 by means of leaf springs 29.

Vibration sensors 11 and 12 are secured to the oscillating bridge 9 in such a manner that they sense the vibrations of the bridge 9 relative to the machine bed. The vibration sensors 11, 12 may, for example, be of the vibration speed sensing type or piezo force transducers may be used. The phase pick-up 3 and the vibration sensors 11, 12 are operatively connected to a measuring and indicating apparatus 13 which includes signal multiplying circuits. The measuring and indicating apparatus 13 is mounted on the housing 1. Further details regarding the measuring and indicating apparatus 13, the vibration sensors 11, 12 and the phase pick-up 3 are set forth below.

The output signals of the angular position pick-up in the housing 1 are supplied to the processing circuit of the microprocessor and indicating apparatus 13 by conductors not shown. The output signals of the vibration sensors 11 and 12 are supplied to the processor and indicator apparatus 13 through conductors 31 and 32. Separate multiplier circuits in the processor and indicator apparatus 13 multiply the output signal of the angular position pick-up with the output signal of the sensor 11 and also the output signal of the angular position pick-up with the output of the sensor 12. The resulting two product signals are separately supplied to separate indicating devices for the magnitude and angular position, for example, in the form of vectormeters 14 and 15.

The components so far described are part of so-called wheel balancing machines of the prior art. If the d.c. motor now rotates the tire 6, the imbalances or unbalances of the tire will produce respective centrifugal forces which depend on the unbalance, for example, in gram centimeters times the square of the rotational speed. Such a balancing apparatus is intended to display the imbalance or unbalance only, it is not desirable that the display of the imbalance should depend on the rotational speed. This dependency, however, is corrected by a double time integration, whereby the actual display only shows the unbalance values.

As soon as the unbalance or imbalance values are available and displayed with regard to their value or magnitude and with regard to the angular position of the unbalance, it is possible to balance the tire by applying so-called balancing weight, for example, in a conventional manner.

According to the invention the conventional apparatus is further equipped with a drum 20 which is supported by bearings 19 in a machine frame 18. The drum 20 is driven by a drive motor 16, for example, a hydraulic piston cylinder arrangement for horizontally shifting the support frame 18 of the drum 20 back and forth on the slide or guide bed 21. The frame 18 is supported on the guide bed 21 by means of a slide carriage 22. Thus, the drum 20 supported on the shaft 23 in the bearings 19 may be pressed against the tire 6 until a predetermined force is applied to the tire 6. This force is measured by the load cell 17 operatively arranged between the supporting frame 18 and the bearing 19. If now the tire 6 against which the drum 20 bears is rotated by the shaft 2, the non-uniformities will cause variations in the radial force or in the lateral force of the tire. These force variations are comparable to a static or a dynamic imbalance and may be ascertained as vibrations of the oscillating bridge 9 relative to the machine bed 10. As mentioned, these vibrations are measured by the vibration sensors 11 and 12. Contrary to the unbalance which is determined through the centrifugal force, which depends on the square of the rotational speed, the non-uniformity is measured as a direct force which is independent of the rotational speed. This is an important advantage of the invention. Accordingly, the double time integration which is necessary for determining the unbalance, must be switched off. This is accomplished by the selector switch 24 which merely disables the integrating means.

The multiplication of the output signals of the vibration sensors 11 and 12 with the output signal of the angular position indicator or pick-up inherently determines the first harmonics of the forces occuring in the bearings 7 and 8 with great precision even at higher rotational circumferential speeds. Further, these forces correspond to or represent the variations of the uniformity. Therefore, according to the invention it is possible with the present machine to determine the first harmonic of the uniformity variations even at high rotational speeds which heretofore have been used only in connection with balancing operations. By simply multiplying the frequency of the output signal of the angular position pick-up, it is also possible in a simple manner to measure the higher order harmonics. If necessary, the apparatus as described may be supplemented by a conventional grinding mechanism (not shown) for improving the tire uniformity, for example, by grinding the tire flanks.

Another advantage of the present machine is seen in that it enables the measuring of the cone effects, as well as the angle effect. The cone effect is due to a tire belt that has been mounted off-center. In connection with used tires the cone effect may also be caused by a tire which is worn off only on one side. The angle effect is caused by the deformation of the tire in the zone contacting the road surface. The angle effect is also affected by the position of the road surface contact zone relative to the central plane of the tire. Additionally, the angle effect depends on the crossing angle of the carcass layer with the first belting layer. The present apparatus makes it possible to measure the cone effect as well as the angle effect of the tires. For this purpose the static lateral forces of the tire are measured twice, once when the tire rotates forward, and once when the tire rotates backward. The measurement is accomplished by foil strain gages 40 applied to the springs 29 such as leaf springs, supporting the oscillating bridge 9. Based on these measurements the size of the cone or angle effects is calculated in a manner known as such.

Thus, the invention makes it possible to correct the wheel imbalance, to correct the radial force variations, and the lateral force variations. Additionally it makes it possible to determine the conicity as well as the angular effect of a tire and to correct these effects in a manner known as such.

Further, according to the invention it is possible to optimize the running or road characteristics of complete wheels including a rim on which the tire is mounted. This is particularly advantageous if one utilizes the possibility of correcting the values which negatively influence the road characteristic of a tire by means of a single measurement and by means of a single corrective action. For this purpose the selector switch 24 is moved into the position for measuring the unbalance. An unbalanced wheel is secured to the mounting flange 5 on the spindle 2. The drum 20 is then pressed against the tire by the drive 16 with a predeterminable force and the wheel is then rotated by the d.c. motor through the shaft 2, at a rotational speed selected to correspond to a higher driving speed of a vehicle. The centrifugal forces caused by tire and rim imbalances at the predetermined speed and the forces resulting from an insufficient uniformity at this speed are now superimposed on one another and are displayed as an "unbalance". The displayed unbalance value may now be compensated by applying balancing weights in a manner known as such in two planes.

Theoretically it could be said that in this manner neither the imbalance nor the forces occurring due to an insufficient tire uniformity, are exactly compensated only at one operational speed of the tire which corresponds to the speed during the testing. However, for all practical purposes the balancing weights compensate all forces which result on the mounted tire in the direction of the wheel load, (radial load) and in the direction of the vehicle axis (lateral load).

Surprisingly, practice has shown that tires corrected as taught herein show excellent road characteristics even at speeds which deviate substantially from the testing speed of the tire. Thus, a tire has been produced according to the invention having such excellent road characteristics that further workings of the tire for optimizing its road characteristics have been obviated. Furthermore, it is a significant advantage that the apparatus according to the present invention is able to ascertain and correct all values which influence the road characteristics of a tire, by means of a single measurement and to make the correction solely by means of balancing weight alone.

FIG. 3 shows an embodiment of the present apparatus for ascertaining the tire uniformity even at high rotational tire speeds. The same components have the same reference numbers in all figures. The basic structure of the machine of FIG. 3 is the same as in FIGS. 1 and 2, however, with the difference that the spindle 23 of the drum 20 is arranged vertically in FIG. 3 rather than horizontally. Thus, in FIG. 3 the drum 20 rotates in a horizontal plane and so does the tire 6. The drum 20 in FIG. 3 is driven by a d.c. motor 30 through a V-belt 34, for example. In FIG. 1 the motor 30 is not shown because it is located inside the housing 1.

The tire 6 is mounted on the flange 5 and thus to the spindle 2 which in FIG. 3 is also in a vertical position supported by a respective housing or machine frame 18. The angle position pick-up 3 is connected in a formlocking manner to the tire driven shaft 2 and thus it is connected to the tire 6. The drive means 16 move the machine frame 18 back and forth on the guide bed 21 by means of the slide carriage 22 in order to press the tire 6 against the drum 20 rather than the other way around as previously shown in FIG. 2. The drive 16 could drive, for example, a threaded spindle 16' cooperating with the slide carriage 22.

For determining the tire uniformity a predeterminded force is applied to the tire through the drive means 16, whereby the vibration sensors 11 and 12 measure the tire non-uniformity. In this instance only the non-uniformity is to be measured for a subsequent correction thereof, so that the double time integration is not necessary in this embodiment. Frequently it is interesting or expedient to determine not only the first harmonic of the measured force variations, but also higher harmonics, when ascertaining and correcting the non-uniformity. Thus, it may be required to indicate harmonics of a higher order. This may be accomplished in a simple manner by multyplying the frequency of the output signal of the angle position pick-up 3 with a signal representing a suitable harmonic factor.

Incidentally, in FIGS. 1 and 2 the shaft 2 positively drives the wheel or tire 6 whereas in FIG. 3 the tire 6 is driven by the friction with the drum 20. In the operation of FIGS. 1 and 2 the wheel is first balanced and then the forces resulting from tire non-uniformity are measured. In the embodiment of FIG. 3 the unbalance may be initially disregarded for only measuring the forces resulting from tire non-uniformity.

The above mentioned phase pick-up 3 may be of the type manufactured as Model P51 by Carl Schenck AG, Darmstadt, Federal Republic of Germany. The vibration sensors 11, 12 may be of the type known as Model T81 made by the same manufacturer Carl Schenck AG. The measuring and indicating apparatus 13 may be realized by using Model M482/450 also made by the Carl Schenck AG. The Model 482/450 measuring and indicating device comprises signal multyplying circuits which multiply the voltage provided by the vibration sensor with the current of the respective phase pick-up. The product signal resulting from such multiplication represents only the forces effective as a function of the rotational r.p.m. or frequency. This method makes it possible to measure forces caused by unbalances or forces caused by tire non-uniformity. However, the centrifugal forces rise as a square function of the r.p.m. while the voltage of the vibration sensors 11, 12 rises as a linear function of the r.p.m. Thus, for measuring the unbalance of a tire, the respective measured values must be integrated in the apparatus 13 to obtain an unbalance indication independent of the r.p.m. On the other hand, forces caused by tire non-uniformity are to be measured as a function of the r.p.m. Thus, the integration circuits are switched off with the switch 24 when measuring the tire non-uniformity.

Although the invention has been described with reference to specific example embodiments, it will be appreciated, that it is intended, to cover all modifications and equivalents within the scope of the appended claims.

What is claimed is:

1. An apparatus for optimizing the road characteristics of tires or wheels comprising: mounting means for mounting a wheel or tire for rotation about a wheel mounting axis; drum mounting means and drum means mounted thereon for rotation about a drum mounting axis; machine base means supporting said wheel mounting means and said drum mounting means for rotation of said drum means in the same plane of rotation as a wheel or tire to be mounted on said wheel mounting means, carriage means interposed beneath at least one of said wheel mounting means and drum mounting means on the machine base means for translation of said wheel mounting means and drum mounting means one relative to the other; first drive means constructed and arranged for operatively engaging the drum means and a mounted wheel or tire with a predetermined force by relative translation between said drum mounting means and wheel mounting means, second drive means for rotating a mounted wheel or tire at a desired speed when the drum means and mounted wheel or tire are operatively engaged; oscillation bridge means coupled between the machine base and one of said wheel mounting means and drum mounting means and comprising extended bearing means; first transducer means operatively coupled for measuring oscillations of said oscillation bridge means relative to the machine base means and for generating a corresponding first output signal upon rotation of said operatively engaged drum means and a mounted wheel or tire at the desired speed; second transducer means comprising angular position detector means operatively coupled for generating a signal corresponding to the angular position of a mounted wheel or tire; and signal processing means for multiplying said first and second signals to provide information about the unbalance or non-uniformity of a mounted wheel or tire.

2. The apparatus of claim 1, comprising further signal processing means for integrating over time the multiplied first and second signals for determining wheel or tire unbalance independent of the rotational speed of the drum and mounted wheel or tire.

3. The apparatus of claim 1, wherein said drum mounting means is mounted on said carriage means for translation on the machine base operatively to engage the circumference of a wheel or tire mounted on the wheel mounting means, and wherein the wheel mounting means comprises spindle means mounted on the extended bearing means of said oscillation bridge means, said bridge means being resiliently mounted for oscillatory motion of the bridge means in the event of unbalance or non-uniformity of a rotating wheel or tire mounted on the spindle means.

4. The apparatus of claim 3, wherein said wheel mounting means and drum mounting means are constructed and arranged for rotation of the drum means and a mounted wheel or tire in a common vertical plane, said extended bearing means comprising vertical pedestal bearing means.

5. The apparatus of claim 1 or 3, comprising further signal processing means for integrating over time the multiplied first and second signals for determining unbalance of a mounted wheel or tire independent of the rotational speed and switch means for switching off said further signal processing means during testing for non-uniformities in a mounted wheel or tire.

6. The apparatus of claim 1, wherein said wheel mounting means is mounted on said carriage means for translation on the machine base means for operatively engaging the drum means, and wherein said drum mounting means comprises spindle means coupled to the extended bearing means of said oscillatory bridge means, said oscillatory bridge means being resiliently mounted for oscillatory motion in the event of an unbalance or non-uniformity of a rotating wheel or tire mounted on said wheel mounting means.

7. The apparatus of claim 6, wherein said drum mounting means and wheel mounting means comprise vertical mounting axes for rotation of the drum means and a mounted wheel or tire in a common horizontal plane, said extended bearing means comprising horizontal arm bearing means.

8. The apparatus of claims 3 or 6, wherein said oscillation bridge resilient mounting means comprises leaf springs.

9. The apparatus of claim 1, further comprising strain gage means for measuring the predetermined force of engagement of said drum means and a mounted wheel or tire.

10. The apparatus of claim 1, wherein said angular position detector means comprises a mechanical coupling with the wheel mounting means rotational axis.

11. The apparatus of claim 1, wherein said oscillation bridge means comprises a subcritically tuned oscillation bridge means having first and second extended bearing means for supporting either said drum mounting means or said wheel mounting means.

12. The apparatus of claim 11, wherein said resiliently mounted oscillation bridge means comprises first and second upright pedestal bearings and wherein said wheel mounting means comprises horizontal spindle means supported on said pedestal bearings.

13. The apparatus of claim 11, wherein said oscillation bridge means comprises sleeve bearing means having a vertical sleeve axis coupled to said bridge means through said transducer means, and wherein said drum mounting means comprises a vertical spindle mounted for rotation in said sleeve bearing means, said extended bearing means comprising horizontal arm bearing means coupled to said sleeve bearing means.

14. The apparatus of claim 1, wherein said angular position detector means comprises mechanical coupling means coupled to said wheel mounting means in a force transmitting manner.

* * * * *